United States Patent
Belcher et al.

(10) Patent No.: US 11,423,463 B2
(45) Date of Patent: Aug. 23, 2022

(54) DYNAMICALLY RENDERED INTERFACE ELEMENTS DURING ONLINE CHAT SESSIONS

(71) Applicant: PayPal, Inc., San Jose, CA (US)

(72) Inventors: Berry Belcher, Des Moines, NE (US); Ragunath Jayabalakrishnan, Austin, TX (US); Vamsikrishna Sanisetty, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 164 days.

(21) Appl. No.: 16/732,257

(22) Filed: Dec. 31, 2019

(65) Prior Publication Data
US 2021/0201380 A1 Jul. 1, 2021

(51) Int. Cl.
  *G06Q 30/00* (2012.01)
  *G06Q 30/06* (2012.01)
  *H04L 51/046* (2022.01)

(52) U.S. Cl.
  CPC ..... *G06Q 30/0631* (2013.01); *G06Q 30/0641* (2013.01); *H04L 51/046* (2013.01)

(58) Field of Classification Search
  CPC .............. G06Q 30/00; G06Q 30/0601; G06Q 30/0623; G06Q 30/0625; G06Q 30/0633; G06Q 30/0641
  See application file for complete search history.

(56) References Cited

U.S. PATENT DOCUMENTS

| | | | | |
|---|---|---|---|---|
| 6,731,788 B1 * | 5/2004 | Agnihotri | .............. | G11B 27/28 382/165 |
| 8,458,053 B1 * | 6/2013 | Buron | ................ | G06Q 30/0631 705/26.1 |
| 8,660,912 B1 * | 2/2014 | Dandekar | .............. | G06Q 30/02 705/26.1 |
| 8,977,554 B1 * | 3/2015 | Hertschuh | .......... | G06Q 30/0623 704/270 |
| 9,224,167 B2 * | 12/2015 | Lampert | ............ | G06Q 30/0633 |

(Continued)

OTHER PUBLICATIONS

Bidigare, Sarah. "Information architecture of the shopping cart." Best practices for the information architectures of e-commerce ordering systems (2000). (Year: 2000).*

(Continued)

*Primary Examiner* — Christopher B Seibert
(74) *Attorney, Agent, or Firm* — Haynes and Boone, LLP

(57) ABSTRACT

There are provided systems and methods for dynamically rendered interface elements during online chat sessions. A user may engage in online communications with another user, such as a communication session between a customer and a customer representative or agent of a merchant. During this communication session, the agent may navigate to particular data on the agent's device, which may be desirable to provide to the customer. For example, the agent may view a particular item of interest to the customer. An application programming interface of the merchant may detect one or more actions or calls associated with this data and may dynamically provide an interface element to transmit data displayed on the agent's device to the customer's device during the communication session. The customer may view a dynamically rendered interface element that allows for processing data during the communication session with the agent.

20 Claims, 5 Drawing Sheets

(56) References Cited

U.S. PATENT DOCUMENTS

| | | | | |
|---|---|---|---|---|
| 9,613,160 B2* | 4/2017 | Houle | | G06F 40/143 |
| 2006/0224973 A1* | 10/2006 | Albrecht | | G06F 9/451 |
| | | | | 715/760 |
| 2007/0050406 A1* | 3/2007 | Byers | | G06F 16/48 |
| 2007/0106570 A1* | 5/2007 | Hartman | | G06Q 20/12 |
| | | | | 705/26.8 |
| 2007/0112647 A1* | 5/2007 | Borders | | G06Q 30/016 |
| | | | | 705/26.81 |
| 2007/0294240 A1* | 12/2007 | Steele | | G06F 16/951 |
| | | | | 707/999.005 |
| 2008/0244721 A1* | 10/2008 | Barrus | | H04L 9/0819 |
| | | | | 726/9 |
| 2009/0037291 A1* | 2/2009 | Dawson | | G06Q 30/0603 |
| | | | | 705/27.2 |
| 2009/0132347 A1* | 5/2009 | Anderson | | G06Q 30/02 |
| | | | | 705/30 |
| 2009/0157479 A1* | 6/2009 | Caldwell | | G06Q 30/0631 |
| | | | | 705/26.7 |
| 2009/0292778 A1* | 11/2009 | Makar | | G06F 16/00 |
| | | | | 345/619 |
| 2010/0030578 A1 | 2/2010 | Siddique et al. | | |
| 2010/0114654 A1* | 5/2010 | Lukose | | G06Q 30/0256 |
| | | | | 705/14.54 |
| 2011/0184834 A1* | 7/2011 | Perrochon | | G06Q 30/0633 |
| | | | | 705/26.8 |
| 2012/0123675 A1 | 5/2012 | Parker, II | | |
| 2012/0136756 A1* | 5/2012 | Jitkoff | | G06Q 30/0633 |
| | | | | 715/224 |
| 2012/0191569 A1* | 7/2012 | Shah | | G06Q 30/0613 |
| | | | | 705/26.41 |
| 2012/0221437 A1* | 8/2012 | Yoo | | G06Q 20/209 |
| | | | | 705/26.41 |
| 2012/0233020 A1* | 9/2012 | Eberstadt | | G06Q 30/06 |
| | | | | 705/26.1 |
| 2012/0310738 A1* | 12/2012 | Mesaros | | G06Q 50/01 |
| | | | | 705/14.57 |
| 2013/0013427 A1* | 1/2013 | Gonsalves | | G06Q 30/02 |
| | | | | 705/27.1 |
| 2013/0066987 A1* | 3/2013 | Levinson | | G06Q 10/10 |
| | | | | 709/206 |
| 2013/0066988 A1* | 3/2013 | Levinson | | G06Q 10/107 |
| | | | | 709/206 |
| 2013/0076788 A1* | 3/2013 | Ben Zvi | | G06F 16/951 |
| | | | | 345/633 |
| 2013/0219263 A1 | 8/2013 | Abrahami | | |
| 2013/0290149 A1* | 10/2013 | Rashwan | | G06Q 30/0641 |
| | | | | 705/27.1 |
| 2013/0325980 A1* | 12/2013 | Oh | | H04L 51/066 |
| | | | | 709/206 |
| 2013/0339229 A1* | 12/2013 | Li | | G06Q 20/32 |
| | | | | 705/40 |
| 2014/0019367 A1* | 1/2014 | Khan | | G06Q 20/425 |
| | | | | 705/16 |
| 2014/0095583 A1* | 4/2014 | Houle | | G06F 40/197 |
| | | | | 709/203 |
| 2014/0136334 A1* | 5/2014 | Lagassey | | G06Q 30/0241 |
| | | | | 705/14.69 |
| 2014/0136990 A1* | 5/2014 | Gonnen | | H04L 51/18 |
| | | | | 715/752 |
| 2014/0229339 A1* | 8/2014 | Massiere | | G06Q 20/40 |
| | | | | 705/26.81 |
| 2014/0258888 A1 | 9/2014 | Varadarajan | | |
| 2014/0279266 A1* | 9/2014 | Lampert | | G06Q 30/0629 |
| | | | | 705/26.64 |
| 2014/0297362 A1* | 10/2014 | Kumar | | G06Q 30/0253 |
| | | | | 705/7.29 |
| 2014/0297537 A1* | 10/2014 | Kassemi | | G06Q 20/3674 |
| | | | | 705/67 |
| 2015/0052061 A1* | 2/2015 | Anderson | | G06Q 20/409 |
| | | | | 705/44 |
| 2015/0088655 A1* | 3/2015 | Taylor | | G06Q 30/0264 |
| | | | | 705/14.61 |
| 2015/0088686 A1* | 3/2015 | Glassberg | | G06Q 50/01 |
| | | | | 705/26.8 |
| 2015/0142640 A1* | 5/2015 | Kneen | | G06Q 20/22 |
| | | | | 705/39 |
| 2015/0149168 A1* | 5/2015 | Stent | | G10L 15/22 |
| | | | | 704/235 |
| 2015/0264173 A1 | 9/2015 | Diana et al. | | |
| 2015/0317698 A1* | 11/2015 | Kalyvas | | G06Q 30/0214 |
| | | | | 705/14.66 |
| 2016/0042420 A1* | 2/2016 | Purcell | | G06Q 30/0613 |
| | | | | 705/26.41 |

OTHER PUBLICATIONS

Chen, Edward T. "Leveraging It for a Competitive Advantage—Case of Ebay." Issues in Information Systems 6.2 (2005): 77-89. (Year: 2005).*

* cited by examiner

DYNAMICALLY RENDERED INTERFACE ELEMENTS DURING ONLINE CHAT SESSIONS

TECHNICAL FIELD

The present application generally relates to rendering interface elements within application windows and more particularly to generating and dynamically rendering a checkout interface element for an item during an online chat session between a user and a merchant's agent.

BACKGROUND

Users may utilize online merchant marketplaces for browsing and shopping for items, where the online merchant marketplaces may provide item data that may be accessed and presented to users via user devices and applications. While browsing item data, a user may also interact with an agent of a particular merchant through the marketplace platform for issues, such as to request help finding items or determining item ordering parameters (e.g., size, color, etc.). These interactions may be provided through a chat session between the user and the agent, such as an instant messaging session that may allow for exchange of text. However, these chat sessions are typically constrained to merely allow the user to converse with the agent. The user may still be required to locate data on the online platform, including navigating to item data with the platform and selecting the correct parameter. This causes additional time and processing while searching and navigating between different data on the platform.

Figure 1:
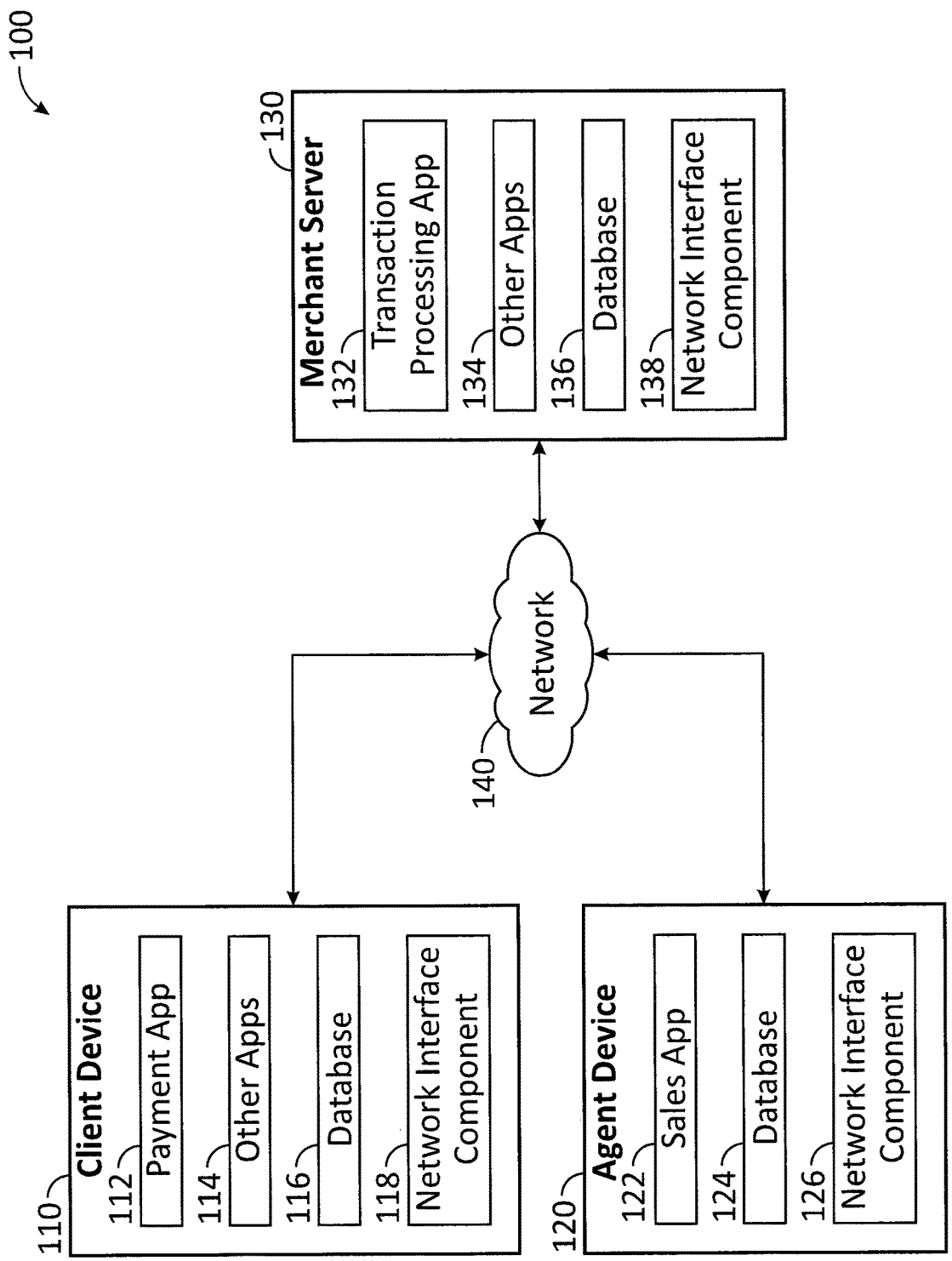
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for dynamically rendering interface elements during online chat sessions. Systems suitable for practicing methods of the present disclosure are also provided.

A user may utilize a computing device to interact with an online merchant platform, such as by browsing through item data for items available for purchase on the online merchant platform. The platform may be accessible through a website and browser application and/or through a resident application on a computing device. In this regard, the merchant marketplace may correspond to an inventory management system and/or database that includes item data for one or more items for sale by the merchant. Item data may be searched and browsed by users, including entering search terms, navigating between interfaces displaying item data, and/or otherwise using the online platform to locate an item for purchase. The online marketplace platform may further include processes to complete a purchase of one or more items with users. Moreover, the online marketplace may further include a process by which a user can converse with a live agent and/or chat bot that allows for assistance using the platform, including finding items, receiving item information and parameters (e.g., advice on size, colors, etc.), recommendation of certain items, and/or checkout and purchase of items. When utilizing this chat feature, the agent or chat bot of the merchant may dynamically render interface elements on the user's computing device within an interface and/or interface field associated with the chat session and feature, where the interface element includes checkout data for an item based on the chat or discussion between the user and the merchant's agent or chat bot. The interface element may allow for a one-touch purchase or navigation to a digital shopping cart and checkout process to complete a purchase of the item.

In order to generate the checkout interface element that may be dynamically rendered on a device of a user for purchase of an item, a merchant server may first receive a request to generate the checkout interface element for a computing device of a user. For example, a user may request help in finding, checking out, and/or purchasing an item from a merchant, which may occur through a communication or chat session established between the user's device and a device of the merchant. In order to receive the request to generate the interface element, a merchant device or agent device for an agent, employee, or other entity providing support for the merchant may transmit the request to the merchant server during the chat session. To transmit the request, a tool, application, or interface element rendered on the agent's device within the chat session and an item data may be selected by the agent. The tool or application may be loaded to a communication or chat application on the agent's device by the merchant or agent, such as by opening an application associated with the merchant to transmit the request or installing and loading a plugin or add-on to the chat application for the merchant's online marketplace platform. An interface element to submit the request may also be generated and dynamically rendered on the agent's device based on the chat session. For example, the user and merchant/agent, either together or individually during the chat session, may navigate to a particular item and/or marketplace interface that allows purchase of the item. This may include viewing a webpage, interface, or other item through the merchant marketplace, which may correspond to an item of interest to the user. Therefore, an application or processes executed by the agent's device, the merchant server, or a service provider server may analyze actions taken during the chat session, such as a particular item being viewed, and automatically generate an interface element within agent interface of the chat session that corresponds to the particular item. The agent may also enter the particular item details for the request to generate the checkout interface element, which may be based on the chat session or other information known by the agent. The agent may utilize the chat application tool for transmitting the request to detect the present item data from an online merchant inventory system for the item being viewed by the user or agent, or item data entered by the user or agent to the chat session.

In some embodiments, the request to generate the checkout interface element for purchase of an item of interest of the user may be generated by detecting the online chat or communication session between the user and the agent and rendering the element on the agent's device based on other available data. For example, the other available data may include windows and/or interfaces open on the user's or agent's device during the chat session (e.g., navigations to particular item data and interfaces for items on the marketplace platform). The other available data may also include the chat data, such as a communication, text, and/or image log of data from the chat session that includes keywords, images, or other data used to determine the particular item of interest to the user. The other available data may therefore include information about an item for sale by the merchant, such as an article of clothing, purchasable product, or other item for sale, which may have particular item data including size, color, amount or number, price, etc., which may be detectable through the currently viewed data in an interface. Once this information is detected, an interface element within the chat application on the agent's device may be dynamically rendered that allows the request for a checkout interface element to be generated and rendered on the user device.

In some embodiments, the request to generate the checkout interface element may correspond to a "broken" digital shopping cart previously generated by the user, which may have been abandoned, lost due to system or device error (e.g., a crash, reboot, etc.), or otherwise lost broken where the digital shopping cart was not processed and completed. In this regard, an application of the agent's device may utilize an application programming interface (API) to interface with a cart generation API or other marketplace API that may be associated with the broken digital cart. This allows the agent's device to retrieve data for the broken digital cart, where the data may include information for the item(s) the user was to purchase in the digital cart, user information that may have been entered, or other data that may have been input with the broken digital cart. The agent may repopulate the broken digital cart or otherwise revive the digital cart so that the user may again view the digital cart and items or other information in the digital cart. In order to do so, item data for those items may be retrieved. Thereafter, the digital cart may further be pushed or transmitted to the user's device via one or more APIs, where a checkout interface element may further be generated for checkout of the revived digital cart, as discussed herein.

Although an agent is described herein, in some embodiments, a chat bot may instead be used, such as an automated application, script, or computing process that converses with a user based on a set of rules and/or automated decision-making engine. For example, the chat bot may include functionality to request that the checkout interface element be dynamically generated, rendered, and presented on the user's device for a particular item of interest to the user. The item of interest may be determined substantially similar by the chat bot and/or service provider based on the above, such as a current webpage, interface, and/or item being viewed by the user or based on keywords, text, or other information in the chat session. In this regard, the user may state words, such as "I would like blue running shoes" or "Please help me find black pants in size 32," which may be used to determine one or more items of interest to the user by the chat bot. This may also be based on decision and/or business rules, which allow for determination of a particular item of interest based on the chat session. The chat bot may determine to transmit the request based on particular words or information entered by the user during the chat session. For example, the user may state "I'd like to purchase those blue shoes," which may indicate an intent to purchase the item of interest. The system may determine an item of interest based on additional data obtained outside the chat session. In some embodiments, the system may identify the user and/or the user computing device and find or otherwise obtain data for previous purchases, searches, postings, and other content that indicates a prior interest for an item, such as a preferred brand, size, price point, and delivery method/cost.

In order to retrieve the item data for the item of interest used to generate the interface element(s), the item data may be accessed from an online merchant inventory for the merchant and/or marketplace platform. For example, an API of the service provider that interfaces with the chat session and a backend merchant inventory system may be capable of receiving API calls to generate the interface element on the agent's and/or user's device. For example, the API of the service provider may be utilized to interface between one or more executable processes, applications, and/or operations (including chat bot operations). The API may correspond to an application or executable processes that generate, render, and present interface elements dynamically during chat sessions and/or through chat or communication applications based on the communications and interface between two or more APIs. This allows for checkout of particular items, for example, through the chat session. The API may therefore communicate data for interface elements associated with the checkout interface element for the user's device. For example, the API may be used to detect and/or receive a request to generate the checkout interface element on the user's device from the agent's device, which may include first dynamically rendering the item transmission and/or checkout request interface element for the item of interest on the agent's device, which allows transmission of the request to the user's device. The request may also be received via a tool, such as a toolbar option, application plugin, and the like that is provided by the service provider through the agent's device. The API may also issue one or more requests or API calls to retrieve the item data by interfacing or communicating with a backend merchant inventory system's API, database, or other available resource to determine item data necessary for a checkout of the item of interest by the user.

In some embodiments, content for the item of interest may include selectable options or configurable parameters, such as different sizes, colors, amounts or number, or other characteristic. Thus, the item data may include multiple different options or items that are required to be selected when checking out and purchasing the item. When the API attempts to fetch, request, or retrieve the item data from the merchant inventory system, the particular item may require selections or options for the parameters in order to dynamically generate the particular item of interest's checkout interface element. The parameters may be selected by the agent when submitting the request for the checkout interface element for the item. The application or process corresponding to the API may also automatically determine the selections based on the chat log or other information for the chat session. Additionally, past purchases by the user of similar items, user preferences, and/or user information (e.g., location, height, weight, etc.) may also be used to automatically determine those selections. The application or process may instead utilize the API to fetch the item data including all selectable parameters, which then allows the user to select the particular parameters when completing a checkout, such as on a digital shopping cart page or other checkout interface. Additionally, the selections for the parameters may be determined from scraping or retrieving data from an online resource, such as a social networking account of the user. For example, user data for the user may correspond to search activity, search queries, and/or search results for the user performed with an online search engine or resource. The other data may correspond to items added to shopping lists or wish lists input by the user with a device application or online merchant marketplace. Additionally, other data of a user's activities or potential item purchases may include preferences set with an application or online resource, such as interests in items and/or item price or availability notices. The other types of activity data may be scraped from online activity of the user, such as likes of items, images, or other users, social networking or microblogging posts, and the like.

Once the item data is retrieved by the API, a process or application of the agent device or merchant server may then generate an interface element that is displayable on the user's device and corresponds to an executable process to complete a purchase of the item from the merchant marketplace and/or inventory system. Thus, the interface element includes some displayable data and selectable processes to initiate and complete the purchase of the item. In some embodiments, the interface element may correspond to an option, displayable in an interface including the interface for the chat session, where selection of the option completes a checkout and purchase of the item. Thus, the interface element may be dynamically rendered within the chat session instance for the corresponding item, which may only occur when the agent navigates to a particular page or interface for the item or the chat window triggers the interface element generation (e.g., based on the chat data). The interface element may be associated with this checkout process and/or a digital shopping cart. The interface element may be dynamically rendered and displayed on the user's device so that the interface element includes information about the item as well as the selectable option to initiate the purchase. For example, the interface element may display the item data for the item with the merchant (e.g., item description, image, price, selected parameters, etc.) and may include a selectable executable process to complete the checkout and purchase. In some embodiments, such as if the user has opted-in to one-click checkout or auto-checkout process that does not require the user to enter account authentication information, shipping and/or billing information, or other required payment and checkout details, a selection of the interface element may complete a purchase of the product. However, the interface element may also navigate the user's device to a checkout page, interface, and/or digital shopping cart with the merchant, a service provider, and/or a merchant marketplace platform where the user may review item details, checkout and payment information, and/or enter user input for the checkout and payment.

In some embodiments, the agent may also wish to provide a recommendation for a second item for purchase with the first item. For example, if the user is attempting to buy running shoes, the user may also have interest in socks or running pants. The agent may therefore provide a second item for recommending to the user with the first item. The second item's data may be therefore retrieved for the recommendation. The checkout interface element may be generated and/or updated (if already displayed on the user's device) based on the second item data. However, another different checkout interface element for the second recommended item may also be generated and dynamically rendered on the user's device. The different checkout interface element for the second item may include an executable process to complete a checkout and purchase of the second item alone or with the first item. The different checkout interface element's executable process may also add the second item to the first item's checkout interface element so that a checkout and purchase through the first item's interface element then processes and purchases both items. In some embodiments, the second item's data may also include advertisements, promotions, and/or videos of the second item that may showcase the product and/or promotions for purchase of the product. In this regard, the agent may further be provided functionality to push or send the videos or other data, either with the second item's checkout interface element or separately, to the user so that the user may view the additional information as part of their checkout experience. This may assist in promoting the second item, for example, by sending short rich media videos that highlights the second item for potential purchase.

Thus, the merchant server (and/or on-device application, such as a resident application that provides similar functionality) may dynamically generate the interface selectable option and an executable process for an application on the user's device that allows the user to purchase the item is a simple manner, such as through a single click of a menu option or the like. The interface option may be automatically presented and populated in an application and/or user interface of the device. This may include, within the chat or communication application, window, or interface, dynamically rendering a push notification, pop-up, or another message. The interface element may correspond to a selectable option, menu, or other displayable graphical element within an interface of the computing device, such as an operating system graphical user interface (GUI) or an application interface. The interface element may be specifically generated for the item, and may be customized based on item, merchant, and/or agent information. The interface element may therefore correspond to both displayable data for the item, as well as application process data used to process a purchase of the item through one or more executable application processes. The generated interface element may then be displayed through a GUI of the user's computing device. For example, the interface element may be dynamically generated and then displayed and rendered through the GUI so that the user may view item information, merchant information, and other information about the item.

Thereafter, the user may wish to process a purchase of the items via the checkout interface element. Selection of the interface element may initiate the process to complete the purchase, which may require a payment instrument from the user. A user may pay for one or more transactions provided through this dynamically rendered interface element using a digital wallet or other account with an online service provider or other transaction processor (e.g., PayPal®). An account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

In order to pay for the transaction (e.g., a transfer or payment to another user, merchant, or other entity), the user may provide user financial or funding source information or may login to an account with the service provider through authentication information and process the transaction using the account. A payment may then be issued to the other party to the transaction and transaction information may be stored with the digital wallet or account. In this regard, a digital token may authorize and/or authenticate the user for their digital wallet use and/or a payment instrument in the digital wallet, which may be transmitted to another party (e.g., the agent and/or merchant) for payment processing. This may allow for single user payments through a payment account and/or digital wallet. In some embodiments, the account and/or digital wallet may be linked to the user's device or application and a one-touch checkout process may be authorized by the user, where selection of the interface element may automatically initiate the process to purchase the item using the account and/or digital wallet.

In further embodiments, the user may request processing a split payment with multiple parties. In such embodiments, a transaction processor for the split transaction may provide an invoice to the parties involved in the split transaction and payment, where the transaction processor may separately process payments for the individual portions of the split transaction with each party. For example, after the agent pushes the checkout interface element to the original user, that user may request to split the checkout payment with one or more other users, such as a parent, friend, or other associated user. The user may therefore provide account names, identifiers, phone or email contacts, or other information, as well as a percentage or amount split with each other party in the split transaction. The transaction processor may generate an invoice that may be split and shared with the identified parties, where each party receives a notification of the split transaction and amount due, and thereafter process a payment through the transaction processor to the merchant for their owed amount. Once all payments have been satisfied and the total amount paid, the agent and/or merchant may receive notification and a token representing fulfillment of the transaction payment, where the split transaction may then be moved to completion.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110, an agent device 120, and a merchant server 130 in communication over a network 140. Client device 110 may be utilized by a user to interact with a merchant through an online merchant marketplace, such as a shopping and purchasing platform provided by agent device 120. During browsing, the user may request assistance from an agent of the merchant, where a chat or communication session (e.g., instant messaging, online chat rooms, VoIP connections, video and/or text data exchange, and the like) may be formed between client device 110 and agent device 120. Agent device 120 may utilize merchant server 130 to request dynamically rendering a checkout interface element on client device 110. Merchant server 130 may determine item data and dynamically render the interface element on client deice 110. Merchant server 130 may then be used to purchase the item through a checkout process and merchant inventory or sales system.

Client device 110, agent device 120, and merchant server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with merchant server 130. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of user and/or vehicle devices may function similarly and/or be connected to provide the functionalities described herein.

Client device 110 of FIG. 1 contains a payment application 112, other applications 114, a database 116, and a network interface component 118. Payment application 112 and other applications 114 may correspond to executable processes, procedures, and/or applications with associated hardware. In other embodiments, client device 110 may include additional or different modules having specialized hardware and/or software as required.

Payment application 112 may correspond to one or more processes to execute software modules and associated components of client device 110 to process electronic transactions over a network with one or more other services and/or users, including browsing items on an online merchant marketplace for a merchant and engaging in communications with a merchant's agent for the merchant. In this regard, payment application 112 may correspond to specialized hardware and/or software utilized by a user of client device 110 that may be used to access a website or an interface of a marketplace or other sales platform for agent device 120 that allows client device 110 to browse item data for items for sale, request help through chat options and interfaces, and engage in communications or a chat with agents for the merchant. Payment application 112 may further be utilized enter or receive transaction data for a transaction (e.g., a payment to another entity, such as a user, merchant, or other payee, which may include item data pushed to client device 110 my an agent or merchant using agent device 120), provide an account, financial data, or a digital token used to pay for the transaction data, and instruct merchant server 130 to perform transaction processing. For example, the transaction data may be received via a checkout interface element dynamically rendered through payment application 112 by merchant server 130 during the chat session with the merchant's agent. Payment application 112 may utilize one or more user interfaces, such as graphical user interfaces presented using an output display device of client device 110, to enable the user associated with client device 110 to enter and/or view interface data, where the interface data may be customized and dynamically output based on data for items generated during the chat or communication session and displayed via a chat interface, window, or other user interface of payment application 112.

In some embodiments, payment application 112 may display data for a marketplace, including item data for browsable items for sale from agent device 120, through an application interface. While browsing the marketplace, the user may establish a communication session with a merchant or merchant's agent, including chat bots, through payment application 112, where the session may correspond to a communication channel and/or data exchange between client device 110 and agent device 120. The communication session may be used by the merchant or agent to transmit one or more interface elements, displayable through the communication session (e.g., in a window or interface for the data exchange), that includes information and processes to complete a purchase of an item. For example, the agent may wish to push item data and a checkout process to client device 110 during the communication session, which is displayed in an interface element of payment application 112. Payment application 112 may include an option to accept or decline the checkout process for the item through an interface element and dynamically generated data based on the item's data and chat session. In other embodiments, payment application 112 may display information for item and the option to accept or decline the item checkout process in another interface, such as a home screen or other operating system screen alert, push notification, pop-up, message, or the like. Thus, an interface of payment application 112 may include interface data and interface elements that allow for interaction with the pushed item data from the agent during the communication session. Such data may be determined by agent device 120 and/or merchant server 130, as discussed herein.

During transaction processing, payment application 112 may be utilized to select payment instrument(s) for use in providing payment for a purchase transaction, transfer, or other financial process. As discussed herein, payment application 112 may utilize user financial information, such as credit card data, bank account data, or other funding source data, as a payment instrument when providing payment information. Additionally, payment application 112 may utilize a digital wallet associated with an account with a payment provider, such as merchant server 130, as the payment instrument, for example, through accessing a digital wallet or account of a user with merchant server 130 through entry of authentication credentials and/or by providing a data token that allows for processing using the account. Payment application 112 may also be used to receive a receipt or other information based on transaction processing. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 140, including retrieving website information (e.g., a website for merchant server 130), presenting the website information to the user, and/or communicating information to the website, including payment information for a transaction processed through merchant server 130. However, in other embodiments, payment application 112 may include a dedicated application of merchant server 130 or other entity (e.g., a merchant), which may be configured to assist in processing transactions electronically.

In various embodiments, client device 110 includes other applications 114 as may be desired in particular embodiments to provide features to client device 110, including those with capturing activities of a user of client device 110 at a particular location. For example, other applications 114 may include security applications for implementing client-side security features, programmatic client applications for interfacing with appropriate application programming interfaces (APIs) over network 140, or other types of applications. Other applications 114 may also include email, texting, voice and IM applications that allow a user to send and receive emails, calls, texts, and other notifications through network 140. Other applications 114 may also include other location detection applications, which may be used to determine a location for client device 110, such as a mapping application. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of client device 110, such as display components capable of displaying information to users and other output components, including speakers.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with one or more application, identifiers associated with hardware of client device 110, or other appropriate identifiers, such as identifiers used for payment/user/device authentication or identification, which may be communicated as identifying the user/client device 110 to merchant server 130. Moreover, database 116 may include received data for item purchases and checkout processes, including chat or communication data for a chat session used by a user and agent for item purchases and dynamically generated and rendered interface elements for item checkout processes.

Client device 110 includes at least one network interface component 118 adapted to communicate with agent device 120, merchant server 130, and/or another nearby device within range of network interface component 118. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 118 may communicate directly with nearby devices using wireless communications, such as Bluetooth Low Energy, LTE Direct, WiFi, radio frequency, infrared, Bluetooth, and near field communications.

Agent device 120 may be implemented using any appropriate hardware and software configured for wired and/or wireless communication with client device 110, and/or merchant server 130 for processing a transaction based on dynamically generated and rendered interface elements on client device 110 by merchant server 130. Agent device 120 may correspond to an agent of a merchant that provides sales through an online merchant marketplace, including merchant websites or other online platforms accessible through a browser application or resident device application. In various embodiments, agent device 120 may be implemented as a personal computer (PC), a smart phone, laptop/tablet computer, wristwatch with appropriate computer hardware resources, other type of wearable computing device, and/or other types of computing devices capable of transmitting and/or receiving data. Although only one merchant device is shown, a plurality of merchant devices may function similarly. For example, agent device 120 may instead correspond to a merchant or merchant chat bot. Although agent device 120 and merchant server 130 are discussed as separate devices and servers, in some embodiments, one or more of the described processes of agent device and merchant server 130 may instead be provided by the other device or server, or the same device or server.

Agent device 120 of FIG. 1 contains a sales application 122, a database 124, and a network interface component 126. Sales application 122 and other applications 134 may correspond to executable processes, procedures, and/or applications with associated hardware. In other embodiments, agent device 120 may include additional or different software as required.

Sales application 122 may correspond to one or more processes to execute modules and associated devices of agent device 120 to provide a convenient interface to permit a merchant for agent device 120 to enter, view, and/or process items the user wishes to purchase based on a chat session between client device 110 and agent device 120. In this regard, sales application 122 may correspond to specialized hardware and/or software utilized by agent device 120 that may provide transaction processing for the items using financial information from client device 110. Thus, sales application 122 may be implemented as an application having a user interface enabling the merchant to enter and/or view the items a user associated with client device 110 wishes to purchase. For example, during a chat session between client device 110 and agent device 120, the user of client device 110 and/or the merchant or merchant's agent of agent device 120 may indicate some item of interest to the user. This may be based on text or communications, and may be associated with a current item, webpage, or interface for an item that client device 110 and/or agent device 120 is displaying. Sales application 122 may include a tool, an add-on, a widget, or other selectable interface option to request generation of the checkout process and checkout interface element for dynamically rendering on client device 110 by merchant server 130. In some embodiments, merchant server 130 may detect the item of interest, such as through page navigations to items and/or chat log data, which may be used to first render an interface element through sales application 122 (e.g., in a chat window or interface) that may be used to request the generation of the checkout process and checkout interface element for client device 110. This may be for item data for an item with agent device 120, such as a merchant inventory system of agent device 120. Once generated, merchant server 130 may display and render the interface element on client device 110.

In some embodiments, sales application 122 may also be used to request generation of another interface element associated with a recommendation to the user based on the first item of interest to the user (e.g., an accompanying item or an item that may be predicted by the agent or a sales bot on purchases by other users). Further, sales application 122 may be utilized to send or push short rich media videos and/or other promotional data to showcase the recommendation to the user through client device 110. Sales application 122 may further enable the merchant to enter coupons and/or discounts for the items, edit the order including adding, removing, and/or modifying items, or other functions with regards the selected items in the purchase and provided through the checkout interface element. In some embodiments, the transaction data may instead be received from client device 110 and/or merchant server 130. Once the items have been finalized for purchase by the user, a total may be calculated, and a transaction may be engaged with the user to complete payment for the selected items, for example, through tokenized data or other information from client device 110. Thus, sales application 122 may request and receive payment covering the selected items from the user. Sales application 122 may alert the merchant when payment for the transaction for the item(s) is completed and may generate a receipt to the user associated with client device 110. In some embodiments, the checkout interface element may interact with the merchant inventory system of agent device 120 to process a payment and order for the item, including requesting purchase and shipment of the item.

Agent device 120 may further include database 124 which may include, for example, identifiers such as operating system registry entries, cookies associated with sales application 122 and/or other applications 134, identifiers associated with hardware of agent device 120, or other appropriate identifiers. Identifiers in database 124 may be used by a payment/service provider to associate agent device 120 with a particular account maintained by the payment/service provider. Database 124 may also further store received transaction data, as well as data for generating interface elements, such as merchant item and sales data, inventory information, sales and discounts, and the like.

Agent device 120 includes at least one network interface component 126 adapted to communicate with client device 110 and/or merchant server 130 over network 140. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant server 130 may be maintained, for example, by an online merchant, marketplace, or service provider, which may provide processes to generate interface elements for display on client devices to purchase items during communication or chat sessions, as well as transaction processing services for those items. In this regard, merchant server 130 includes one or more processing applications which may be configured to interact with client device 110, agent device 120, and/or another device/server to facilitate communications and transactions between users. Merchant server 130 may be maintained by or include another type of platform or service provider, for example, a transaction processor such as PAYPAL®, Inc. of San Jose, Calif., USA. Although agent device 120 and merchant server 130 are discussed as separate devices and servers, in some embodiments, one or more of the described processes of agent device and merchant server 130 may instead be provided by the other device or server, or the same device or server.

Merchant server 130 of FIG. 1 includes a transaction processing application 132, other applications 134, a database 136, and a network interface component 138. Transaction processing application 132, and other applications 134 may correspond to executable processes, procedures, and/or applications with associated hardware. In other embodiments, merchant server 130 may include additional or different modules having specialized hardware and/or software as required.

Transaction processing application 132 may correspond to one or more processes to execute modules and associated specialized hardware of merchant server 130 to process a transaction for item(s) with agent device 120, which may be based on rendering one or more interface elements for the item(s). In this regard, transaction processing application 132 may correspond to specialized hardware and/or software used by a user associated with client device 110 to establish an account with transaction processing application 132 by providing personal and/or financial information to merchant server 130 and selecting authentication credentials. In various embodiments, the financial information may include payment instrument information, such as account/card numbers and information. The account may be used to purchase items. The payment account may be accessed and/or used through a browser application and/or dedicated payment application executed by client device 110, such as payment application 112. However, in other embodiments, a payment account may be generated by another online transaction processor or service provider.

In some embodiments, transaction processing application 132 may generate transaction data for an item from a merchant inventory system with agent device 120, and may communicate with client device 110 to dynamically render an interface element to process a transaction for the item, such as through a digital cart and/or checkout process that may be completed through the interface element. Thus, transaction processing application 132 may interact with client device 110 and/or agent device 120 (e.g., through one or more API calls to APIs of transaction processing application 132 that interfaces with APIs of client device 110 and/or agent device 120). Transaction processing application 132 may first determine that an item of interest may be desired to be purchased by a user during a communication session between client device 110 and agent device 120. For example, transaction processing application 132 may receive a request to generate a checkout process for completion through a checkout interface element from agent device 120. This request may be received by interacting with an executable process, tool, or application on agent device 120, which requests the item data to be accessed and used to generate the checkout interface element. In some embodiments, a first interface element to request transmission of the item data and checkout interface element to client device 110 may first be rendered on agent device 120 during the communication session (e.g., by receiving a chat log and detecting the data or otherwise determining a request or intent to purchase by the user during the communication session). Further, the item of interest may be input by the agent using agent device 120 or may be determined from chat log data or currently viewed items and interfaces on client device 110 and/or agent device 120. Transaction processing application 132 may also utilize chat log data, past purchases, or user preferences to determine configurable or selectable parameters or options for the item of interest, which may then be used to determine the specific item and corresponding item data.

Thus, a API of transaction processing application 132 may then request or access the item data from the merchant through a merchant inventory system with agent device 120. Once accessed, transaction processing application 132 may then generate application or device data for client device 110 to view the item data and complete a transaction for the item in a fast and streamlined manner through one or more device processes. For example, an interface element for a checkout process for the item may be loaded to one or more applications of client device 110. An executable process may be generated to complete the checkout process for the item through an application, such as payment application 112. The executable process may be loaded to client device 110 so that the user may process the item during a chat or communication session without entering data for the purchase, merchant, or user and/or navigating multiple application interfaces.

An interface element and/or option for the executable process may be generated and populated within one or more interfaces of client device 110. In this regard, the interface element may be specifically generated for the item and chat session. The dynamically generated interface element may therefore correspond to a notification, alert, or other displayable data that is presented through a GUI of client device 110 during the chat session that includes the item data. The interface element may correspond to an application process that is used to complete processing of the item through client device 110, such as an electronic transaction processing process of payment application 112. The interface element may be displayed dynamically during the chat session. Additionally, the interface element may be specifically generated for the particular item, for example, using an item image, information, price, and/or merchant image or information, such as a graphical icon, notification, or other data. In other embodiments, interface elements for payment application 112 may be changed, updated or altered based on other recommended purchases.

The interface element may be generated by transaction processing application 132 during the chat session such that the interface element may be displayed through a GUI of client device 110 without requiring the user of client device 110 to specifically request the interface element. In some embodiments, the interface element may also or instead correspond to a pop-up notification, banner notification, or other displayable interface information. If the user accepts the option for the item through the interface element, transaction processing application 132 may be used to process a transaction for the item. An executable process may be initiated within an application on client device 110 (e.g., payment application 112) that uses data for the item to complete electronic transaction processing for the predicted purchase. The executable process may be loaded with data from or corresponding to the interface element, such as item, merchant, price, payment instrument, and/or location data. Transaction processing application 132 may receive the acceptance and may utilize the data from the executable process to complete electronic transaction processing for the item. Transaction processing application 132 may receive a payment request from client device 110 for the transaction data by the account, which may include identifiers, tokens, or other data used for transaction processing using an account, where the account may be provided by merchant server 130 or another external service provider. Transaction processing application 132 may process a payment and may provide a transaction history to client device 110 and/or agent device 120 for transaction authorization, approval, or denial.

In various embodiments, merchant server 130 includes other applications 134 as may be desired in particular embodiments to provide features to merchant server 130. For example, other applications 134 may include security applications for implementing server-side security features, programmatic client applications for interfacing with appropriate application programming interfaces (APIs) over network 140, or other types of applications. Other applications 134 may contain software programs, executable by a processor, including a graphical user interface (GUI), configured to provide an interface to the user when accessing merchant server 130, where the user or other users may interact with the GUI to more easily view and communicate information. In various embodiments, other applications 134 may include additional connection and/or communication applications, which may be utilized to communicate information to over network 140.

Additionally, merchant server 130 includes database 136. Database 136 may store various identifiers associated with client device 110. Database 136 may also store account data, including payment instruments and authentication credentials, as well as transaction processing histories and data for processed transactions. Database 136 may store received data associated with a user, such as tracked data of the user so that correlations between locations and activities may be generated. In some embodiments, one or more chat logs, user preferences, and/or merchant item data may be stored to database 136 for use in generating interface elements for checkout processes. Additionally, database 136 may store transaction data provided to client device 110.

In various embodiments, merchant server 130 includes at least one network interface component 138 adapted to communicate client device 110, agent device 120, and/or another device/server for a merchant over network 140. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
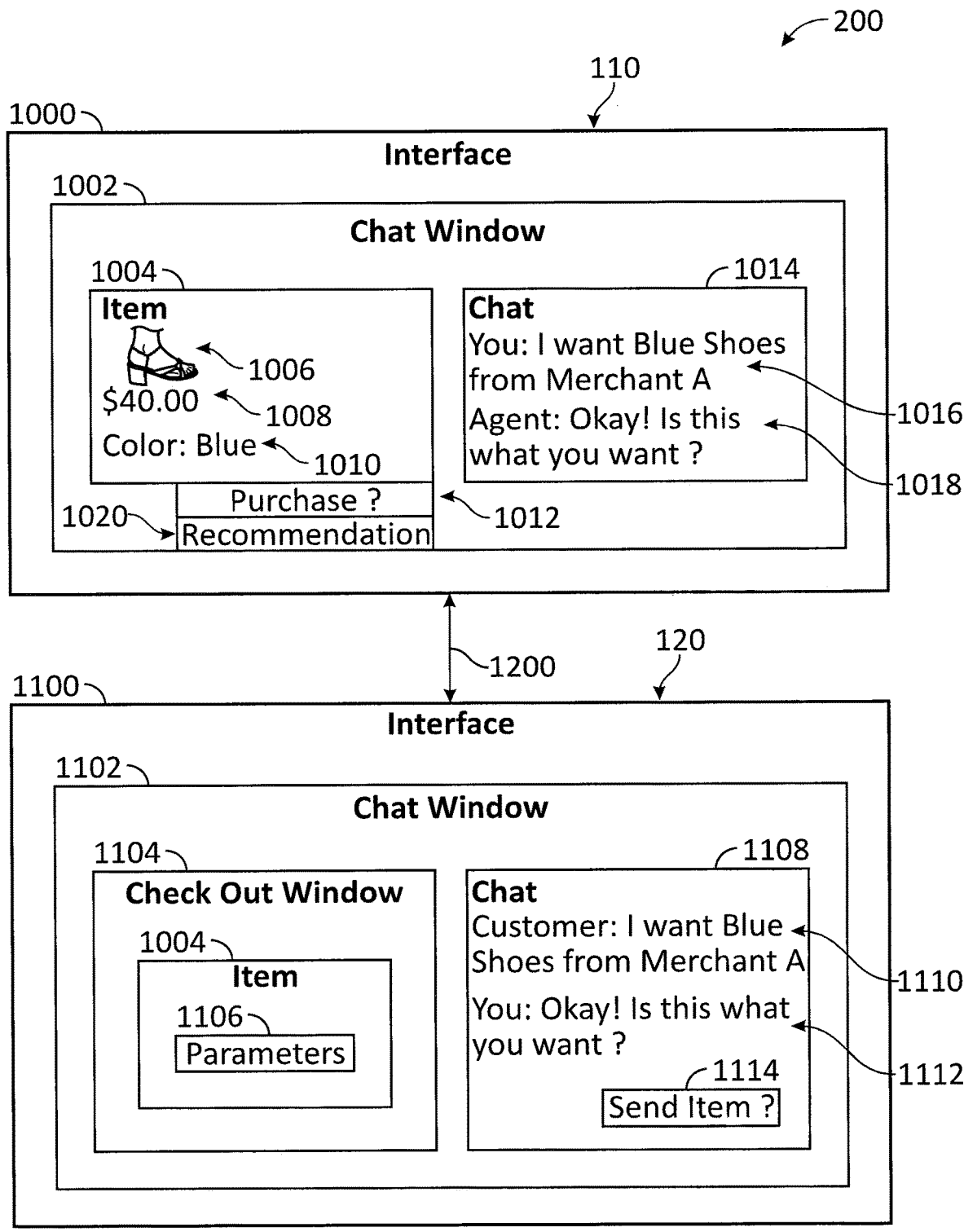
FIG. 2 is an exemplary user interface where users may receive dynamically rendered interface elements for checkout data, according to an embodiment.

FIG. 2 is an exemplary user interface where users may receive dynamically rendered interface elements for checkout data, according to an embodiment. Environment 200 of FIG. 2 includes client device 110 and agent device 120 discussed in reference to system 100 of FIG. 1. In this regard, client device 110 and agent device 120 may interact over an online communication session, such as a text, video, and/or other data exchange where messages may be exchanged between users, merchants, and/or agents (including chat bots) of merchants. In this regard, one or more dynamically rendered interface elements may be presented on client device 110 and/or agent device 120 by a merchant server, such as merchant server 130, during the communication session based on currently viewed data, transmission requests, chat log data, and other information, which may be used to initiate and complete a checkout process for an item.

For example, client device 110 includes an interface 1000 and agent device 120 includes an interface 1100, where interfaces 1000 and 1100 may correspond to GUIs of computing devices used for viewing user interfaces, interacting with applications, viewing item data and dynamically rendered interface elements, and engaging in communication sessions with other users. In this regard, interface 1000 of client device 110 includes a chat window 1002 where a user may be engaging in an online chat session with a merchant or merchant's agent for agent device 120 over connection 1200. Connection 1200 corresponds to a data connection, such as over a network, through short range wireless communications, or other data exchange channel, where the chat session may be performed. Interface 1100 of agent device 120 further includes a chat window 1102 that may similarly be used to engage in the chat session with client device 110 over connection 1200.

Chat window 1002 may be initiated based on a help or assistance request by the user of client device 110 when that user requires assistance for the merchant or agent. The assistance may include asking for input or advice, finding an item, requesting item parameter information, asking about benefits or prices, requesting refunds or recommendation, or other desired information. Thus, the merchant or agent may utilize chat window 1102 displayed in interface 1100 to respond to this request for assistance through the chat session, which may include text, video, and/or image exchange. For example, in a chat box 1014 in chat window 1002, the user of client device 110 may initially propose a request 1016 for the assistance from the merchant or agent, shown as "I want blue shoes from merchant A" (e.g., a question, request statement, query, etc.). The merchant or agent may view this request 1016 in chat box 1108 of chat window 1102, which shows user text 1110 having the same message.

After viewing user text 1110 in chat box 1108, the agent may perform a search for the specific request of the user. In some embodiments, a screen sharing operation may be performed or data of the currently viewed item by the user on client device 110 may be displayed. For example, client device 110 may be used to find item data for an item 1004, such as by browsing an online merchant marketplace through an application and locating items of interest to the user. Thus, an item 1004 may previously have been located by the user, where the user is requesting help for item 1004 from agent device 120. This may include requesting item 1004 in "blue" as noted in request 1016 and user text 1110, or otherwise help with the size, type, amount, price, or other detail or parameter of item 1004. However, in other embodiments, client device 110 may not have any data of a currently viewed item and the merchant or agent may be required to locate the item based on user text 1110 and/or other data, chat bot rules, item information, search engines, and the like. For example, the user utilizing client device 110 may previously have abandoned a digital shopping cart on a merchant marketplace associated with the agent and/or chat window 1002, or otherwise be associated with a broken digital shopping cart. In this regard, based on request 1016, the agent or merchant may locate the broken cart, and may revive or repopulate the cart with the items and other information, which may include accessing item data for item 1004. Once the digital shopping cart is reinstated, the cart may be provided through interface 1000 to the user by the agent or merchant, and a checkout interface element may be generated to complete the cart.

In order to access item data for item 1004, an online merchant inventory and/or marketplace system may be accessed to retrieve the data. Once data for item 1004 is located for client device 110, agent device 120 may be used to assist client device 110 in purchasing that item. Thus, after item data for item 1004 is located by the merchant or agent within chat window 1102, where item 1004 may be desired to be purchased by the user (including the specific parameters of item 1004, such as the color "blue" requested by the user), agent device 120 may request pushing or transmission of a checkout interface element for item 1004 within chat window 1002 by a merchant server that assists in electronic transaction processing for item 1004. For example, chat window 1102 may further include a checkout window 1104 having item 1004 with parameters 1106 selected by the merchant, agent, or user based on chat boxes 1014 and/or 1108. In some embodiments, parameters 1106 may also be automatically selected based on learned data for the user of client device 110. For example, past transactions, user preferences, text analysis of chat logs, online postings, searches, and the like may be used to further identify relevant content based on the chat in determining what to provide on client device 110. Once checkout window 1104 is determined for agent device 120, the merchant or agent may respond in chat box 1108 with a message 1112 "Okay! Is this what you want?" Chat 1014 of client device 110 shows the message as merchant reply 1018, which allows the user to view the message 1112. Moreover, the merchant or agent may then request transmission of item 1004 from the merchant server to client device 110.

Item transmission interface element 1114 may be automatically populated within chat window 1102 when the merchant server detects chat window 1102 or otherwise determines that the merchant or agent would like to request item 1004 to client device 110. However, in other embodiments, item transmission interface element 1114 may correspond to a tool or other interface option/element that may be present within chat window 1102 to transmit the interface element to checkout and purchase item 1004 to client device 110. When item transmission interface element 1114 is selected, the merchant server may generate a checkout interface element for a checkout and purchase process in chat window 1002 of client device 110. In order to generate this, item data may be fetched or retrieved from the online merchant inventory system if the data is not already received by the merchant system. This may include a checkout page or interface or an executable process to automatically process a payment for item 1004 on selection. In some embodiments, the checkout page or interface may include an option to provide a split payment for item 1004 with other users. In this regard, the checkout interface may include an option to split the transaction for item 1004, as well as enter identifiers for each user involved in the split transaction and an amount or percentage due by that user. This may prompt the merchant server and/or a transaction processor to generate an invoice that may be split and/or shared with each user in the split transaction so that those users may provide a partial payment for item 1004. Thereafter, the agent viewing interface 1100 and/or a merchant inventory and sales system may receive a token identifying payment satisfaction so that item 1004 may be provided to the user.

Chat window then displays a checkout interface element 1012 that includes item 1004 showing an image 1006, a price 1008, and a color parameter 1010 (of "blue" as requested by the user). Other details of item 1004 (not shown) may also be presented, such as size, shipping information, item rating, and the like. Checkout interface element 1012 include a purchase option within chat window 1002 that initiates the purchase of item 1004, such as by navigating to a digital cart or a checkout page and/or providing one-click purchase when selecting the option. Further, another interface element (a recommendation interface element 1020) may be pushed or transmitted to client device 110 by the merchant or agent for a recommendation of an item to purchase with item 1004, such as a dress, pants, or socks. Selection of recommendation interface element 1020 may similarly initiate a purchase and checkout of the recommended item. However, in other embodiments, selection of recommendation interface element 1020 may add the recommended item to a purchase of item 1004 or otherwise update a digital cart for item 1004.

Figure 3:
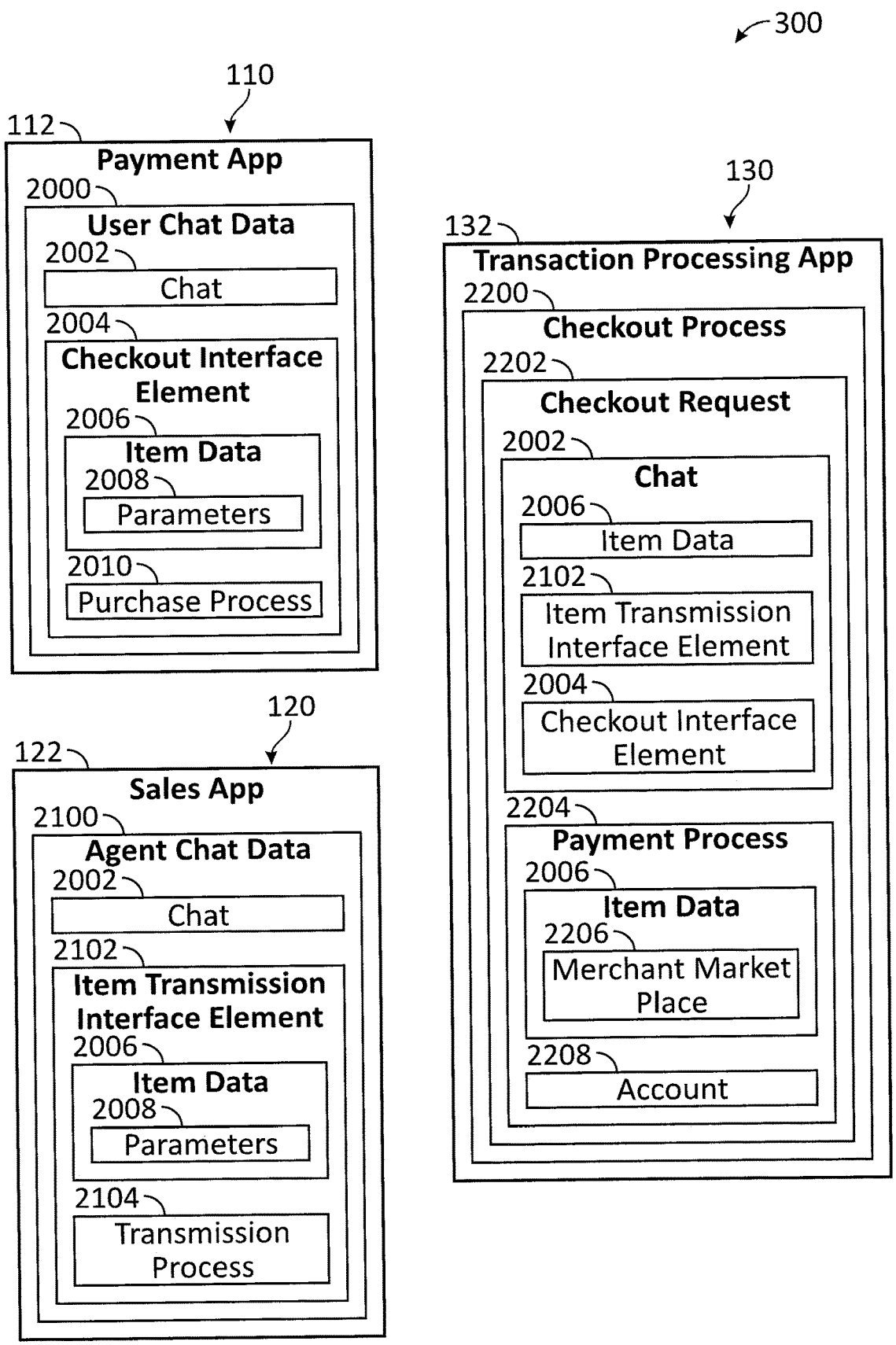
FIG. 3 is an exemplary system environment where a client device interacts with an agent device and a merchant server for dynamically rending checkout interface elements during chat sessions, according to an embodiment.

FIG. 3 is an exemplary system environment where a client device interacts with an agent device and a merchant server for dynamically rending checkout interface elements during chat sessions, according to an embodiment. System 300 of FIG. 3 includes client device 110, agent device 120, and merchant server 130 discussed in reference to system 100 of FIG. 1.

Client device 110 executes payment application 112 used to communicate with agent device 120 for assistance with one or more items for purchase, where payment application 112 corresponds generally to application discussed in reference to system 100. In this regard, payment application 112 includes user chat data 2000 for an online communication session with agent device 120, where user chat data may include text, images, video, hyperlinks and/or executable processes for navigation, and/or dynamically rendered interface elements to process or complete certain operations, such as checkout processes for items. For example, user chat data 2000 includes a chat 2002 for a conversation between a user and a merchant or agent for the merchant (e.g., a live agent or chat bot). During chat 2002, the user may wish to purchase an item, where agent device 120 may request merchant server 130 to send a checkout interface element to client device 110 for processing a purchase of the item.

Thus, agent device 120 executes sales application 122 used to communicate with client device 110 to provide assistance to a user during a chat session and send checkout interface elements to process transaction during the chat session, where sales application 122 corresponds generally to the application discussed in reference to system 100. In this regard, sales application 122 includes agent chat data 2100 corresponding to merchant- or agent-side data for chat 2002 with client device 110. Thus, the agent may utilize agent chat data to send a checkout process for one or more items to client device 110 using a checkout interface element provided by merchant server 130. Request for sending this checkout interface element to client device 110 may be performed through item transmission interface element 2102, which may point to particular item data 2006 and parameters 2008 for the item data. A transmission process 2104 may then be used to send the request to merchant server 130 for generation and transmission of the checkout interface element with client device 110.

Merchant server 130 executes transaction processing application 132 used to communicate with client device 110 and agent device 120 to dynamically render interface elements for use during online communication sessions, where transaction processing application 132 corresponds generally to the application discussed in reference to system 100. To send an interface element, transaction processing application 132 may execute checkout process 2200 to generate a process by which an item may be purchased through a checkout interface element during chat 2002. This may correspond to checkout interface element 2004 displayed through payment application 112, which includes item data 2006 and parameter 2008 as provided by agent device 120. Further, a purchase process 2010 may be generated and provided through checkout interface element 2004 that allows for processing of item data 2006 with an online merchant inventory system to purchase the item. For item data 2006, a checkout request 2202 may be processed for chat 2002, which includes item transmission interface element 2102 and checkout interface element 2004. Checkout request 2202 for chat 2002 therefore processes payment process 2204 with merchant marketplace 2206 for item data 2006. An account 2208 of the user for client device 110 may also be used to process a payment using one or more payment instruments. Although the data and processes for agent device 120 and merchant server 130 are shown as residing on different devices, in other embodiments, those data and processes may be performed by the same device or server.

Figure 4:
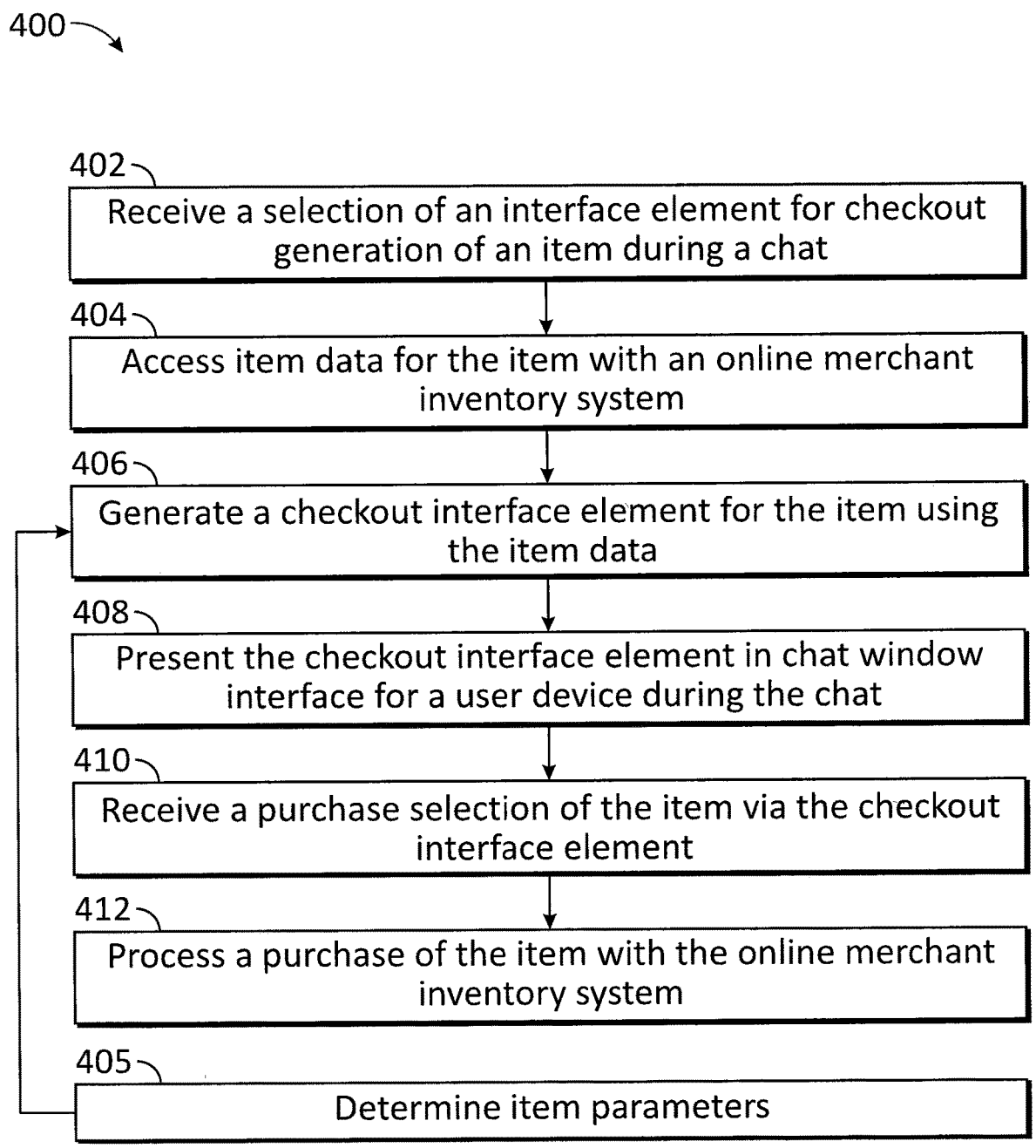
FIG. 4 is a flowchart of an exemplary process for dynamically rendered interface elements during online chat sessions, according to an embodiment.

FIG. 4 is a flowchart of an exemplary process for dynamically rendered interface elements during online chat sessions, according to an embodiment. Note that one or more steps, processes, and methods described herein of flowchart 400 may be omitted, performed in a different sequence, or combined as desired or appropriate.

At step 402 of flowchart 400, a selection of an interface element for checkout generation of an item is received during a chat, or the interface element may be dynamically rendered based on data associated with the chat. This may correspond to receiving an indication, such as a request, from an agent device of an agent of a merchant (e.g., an employee, chat bot, external service provider, etc.). This interface element may correspond to a tool, icon, or option within a chat window for the agent's device that allows the agent to request a checkout process and checkout interface element be generated and dynamically rendered on a user's device that is communicating with the agent's device during the chat. Moreover, the item may correspond to an item be viewed by the user and/or agent or may be determined based on analysis of the chat. In such embodiments, prior to selecting the interface element, the agent's device or a merchant server associated with the device may detect that the agent and/or user has navigated to a page associated with the item. In response to detecting this navigation event, the interface element on the agent's device may be dynamically rendered for requesting a checkout interface element for the user's device. The interface element may also be generated and dynamically rendered on the agent's device in response to particular statements, cues, images, text, or other data in the chat. For example, the user may state, "I want blue shoes from merchant A," which may trigger generation of an interface element on the agent's device (in this example the interface element may be specific to the particular item or in other embodiments may not be specific to the particular item). The interface element for the agent's device may be dynamically rendered within the chat instance, such as in a window or interface of the chat, or elsewhere (e.g., in another application, a toolbar, or the like).

At step 404, item data for the item with an online merchant inventory system is accessed, where the item data may correspond to item information necessary to process a purchase of the item by a user, merchant, and/or transaction processor (e.g., price, item identifier, etc.). The online merchant inventory system may be accessed through a merchant marketplace or may correspond to other platforms and databases for the merchant that may be available to be queried by an API of the transaction processor for item data. The API of the transaction processor may therefore communicate with one or more other applications to facilitate dynamically rendering interface elements on devices using the data through one or more API interactions, exchanges, and/or data calls. At step 406, a checkout interface element for the item is generated using the item data. The checkout interface element may correspond to displayable data within an interface, where selection of the element initiates a process to purchase the item. The process to purchase the item may correspond to a checkout page and/or digital cart or may correspond to a one-touch or one-click process that automatically purchases the item using a payment instrument of the user without user authentication or information (e.g., through a "stay logged in" process or authentication process that requires less or no entry of input by a user). Prior to step 406, an option step 405 may include determining item parameters for the item, including size, color, amount, etc. This may be based on user preferences, past purchases, and the like, or based on user/agent input and/or information in the chat.

At step 408, the checkout interface element is presented in a chat window interface for a user device during the chat. The checkout interface element may be dynamically rendered within the chat window interface, such as by populating the element in the interface automatically based on the item data and chat data. This allows the user to view the item data as set by the agent during the chat session. The checkout interface element may include displayable information for the item, as well as a selectable option to initiate a purchase of the item. Thus, at step 410, a purchase selection of the item is received via the checkout interface element. This may include selecting the option within the interface element. In some embodiments, account information, authentication, and/or other necessary payment processing data may be previously stored and set for an automatic checkout. However, in other embodiments, the purchase select may include navigation to a digital shopping cart and/or checkout interface, where the user may be required to enter payment information. Thereafter, at step 412, a purchase of the item is processed with the merchant inventory system. Thus, the transaction processor system requests processing of the purchase with the backend merchant system to complete payment, ordering, and other requirements to have the item purchased and obtained by the user.

Figure 5:
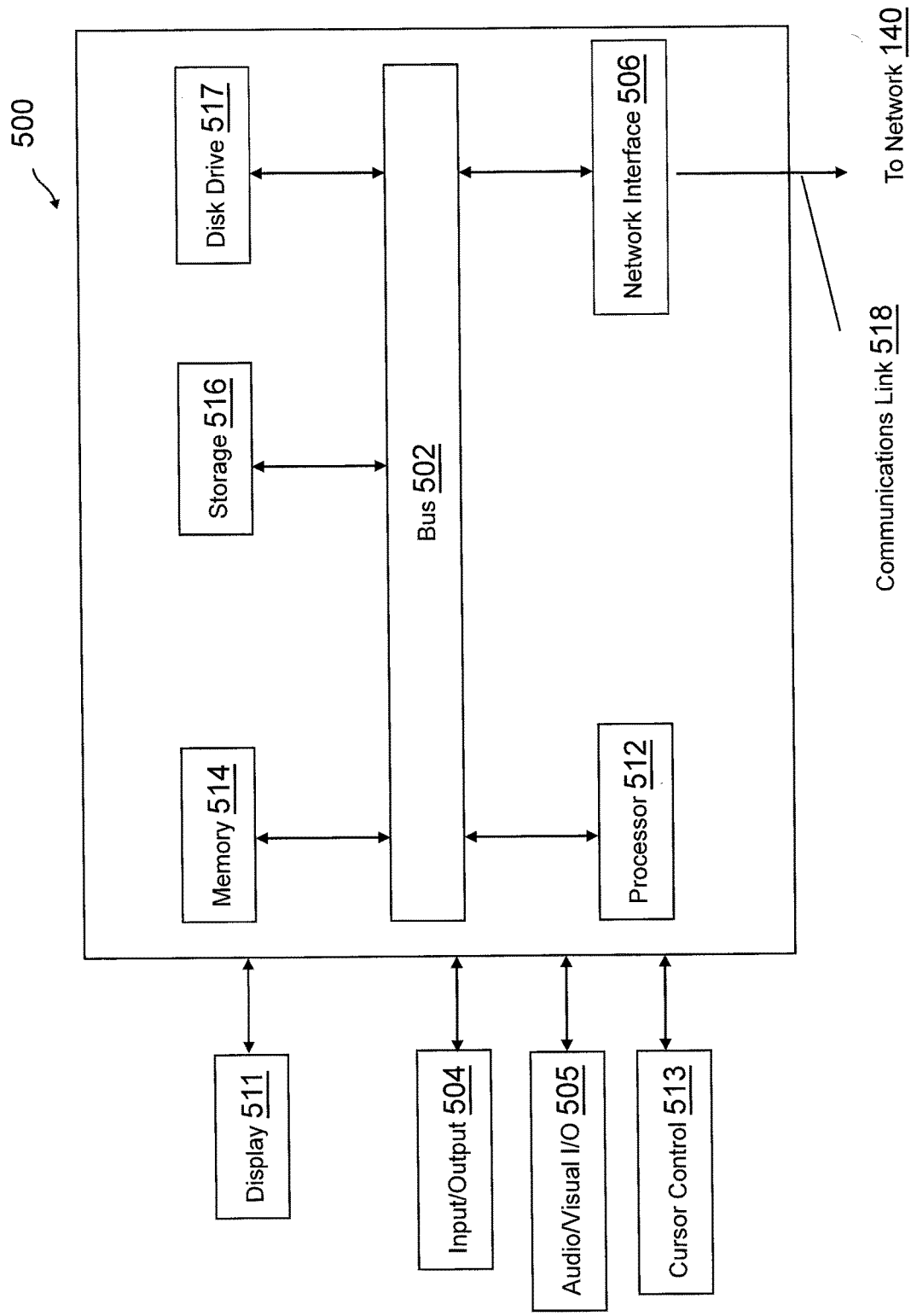
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A merchant system comprising:
   a non-transitory memory; and
   one or more hardware processors coupled to the non-transitory memory and configured to read instructions from the non-transitory memory to cause the merchant system to perform operations comprising:
   determining a tool to request a checkout interface element during an online chat session between an agent of a merchant associated with the merchant system and a user on an online chat platform via an application programming interface (API) integration of a merchant marketplace platform for the merchant system, wherein the merchant marketplace platform is separate from the online chat platform;
   receiving chat log data for the online chat session using the API integration;
   determining a user interface element for the tool from the chat log data;
   providing the user interface element to the agent during the online chat session;
   accessing merchant item data from a merchant inventory system of the merchant via an API of the merchant system in response to detecting a selection of the user interface element corresponding to an agent window associated with the online chat session, wherein the API comprises a process for generating and presenting the checkout interface element during the online chat session to the user;
   generating the checkout interface element for a first item based on the merchant item data, wherein a selection of the checkout interface element causes a checkout page corresponding to the first item to be loaded or causes a purchase of the first item to be processed; and dynamically rendering the checkout interface element within a user chat window of the online chat session on the online chat platform using the API integration, wherein the dynamically rendering the checkout interface element further includes the merchant item data for the first item.

2. The merchant system of claim 1, wherein the providing the user interface element comprises dynamically rendering the user interface element within the agent window in a placement associated with the merchant item data in the online chat session.

3. The merchant system of claim 1, wherein the operations further comprise:
receiving a request to purchase the first item from the user via the checkout interface element; and
processing an electronic transaction for the first item with the merchant inventory system using an account for the user with the merchant system.

4. The merchant system of claim 3, wherein the account for the user comprises one of an auto-checkout opt-in preference or a one-touch opt-in preference, and wherein the processing the electronic transaction is in response to the receiving the request via the selection of the checkout interface element in the online chat session.

5. The merchant system of claim 1, wherein the accessing the merchant item data is from a networked database of the merchant inventory system.

6. The merchant system of claim 1, wherein prior to the generating the checkout interface element, the operations further comprise one of:
determining user preferences for the first item using at least one of the online chat session or past user purchase preferences of the user; or
querying the agent for the user preferences for the first item,
wherein the generating the checkout interface element is further based on the user preferences.

7. The merchant system of claim 1, wherein the operations further comprise:
receiving a recommendation for a second item from the agent;
generating a recommendation interface element for the recommendation; and
dynamically rendering the recommendation interface element with the checkout interface element within the online chat session.

8. The merchant system of claim 7, wherein the recommendation interface element causes one of a purchase the second item or a purchase the first item with the second item.

9. The merchant system of claim 1, where prior to the accessing the merchant item data, the operations further comprise:
receiving the selection via the user interface element displayed during the online chat session.

10. The merchant system of claim 1, wherein prior to the generating the checkout interface element, the operations further comprise:
dynamically rendering an item transmission interface element for the first item during the online chat session on an agent device of the agent; and
receiving a transmission request of the checkout interface element to the user via the item transmission interface element.

11. The merchant system of claim 1, wherein prior to the generating the checkout interface element, the operations further comprise:
dynamically displaying the merchant item data to the agent via an agent device of the agent during the online chat session using the API; and
receiving, from the agent device, a selection of the first item from the merchant item data.

12. The merchant system of claim 11, wherein the agent comprises a live agent of the user that interfaces with a user device of the user via the agent device using an online chat application, and wherein the API communicates with a chat application API of the online chat application that comprises a plug-in for the tool to provide the user interface element.

13. The merchant system of claim 1, wherein prior to the generating the checkout interface element, the operations further comprise:
receiving a user preference for an item parameter of the first item,
wherein the generating the checkout interface element is further based on the user preference.

14. A method comprising:
determining a tool to request a checkout interface element during an online chat session between an agent of a merchant associated with a merchant system and a user on an online chat platform via an application programming interface (API) integration of a merchant marketplace platform for the merchant system, wherein the merchant marketplace platform is separate from the online chat platform;
receiving chat log data for the online chat session using the API integration;
determining a user interface element for the tool from the chat log data;
providing the user interface element to the agent during the online chat session;
detecting a selection of the user interface element corresponding to an agent window associated with the online chat session;
in response to the detecting, accessing merchant item data from a merchant inventory system of the merchant via an API of the merchant system, wherein the API comprises a process for generating and presenting the checkout interface element during the online chat session to the user;
generating the checkout interface element for a first item based on the merchant item data, wherein a selection of the checkout interface element causes a checkout page corresponding to the first item to be loaded or causes a purchase of the first item to be processed; and
dynamically rendering the checkout interface element within a user chat window of the online chat session on the online chat platform using the API integration, wherein the checkout interface element further includes the merchant item data for the first item.

15. The method of claim 14, wherein the providing the user interface element comprises dynamically rendering the user interface element within the agent window in a placement associated with the merchant item data in the online chat session.

16. The method of claim 14, further comprising:
receiving a request to purchase the first item from the user via the checkout interface element; and
processing an electronic transaction for the first item with the merchant inventory system using an account for the user with the merchant system.

17. The method of claim 16, wherein the account for the user comprises one of an auto-checkout opt-in preference or a one-touch opt-in preference, and wherein the processing the electronic transaction is in response to the receiving the request via the selection of the checkout interface element in the online chat session.

18. The method of claim 14, wherein the accessing the merchant item data is from a networked database of the merchant inventory system.

19. The method of claim 14, wherein prior to the generating the checkout interface element, the method further comprises one of:
   determining user preferences for the first item using at least one of the online chat session or past user purchase preferences of the user; or
   querying the agent for the user preferences for the first item,
   wherein the generating the checkout interface element is further based on the user preferences.

20. A non-transitory machine-readable medium having stored thereon machine-readable instructions executable to cause a machine to perform operations comprising:
   determining a tool to request a checkout interface element during an online chat session between an agent of a merchant associated with a merchant system and a user on an online chat platform via an application programming interface (API) integration of a merchant marketplace platform for the merchant system, wherein the merchant marketplace platform is separate from the online chat platform;
   receiving chat log data for the online chat session using the API integration;
   determining a user interface element for the tool from the chat log data;
   providing the user interface element to the agent during the online chat session;
   accessing merchant item data from a merchant inventory system of the merchant via an API of the merchant system in response to detecting a selection of the user interface element corresponding to an agent window associated with the online chat session, wherein the API comprises a process for generating and presenting the checkout interface element during the online chat session to the user;
   generating the checkout interface element for a first item based on the merchant item data, wherein a selection of the checkout interface element causes a checkout page corresponding to the first item to be loaded or causes a purchase of the first item to be processed; and
   dynamically rendering the checkout interface element within a user chat window of the online chat session on the online chat platform using the API integration, wherein the dynamically rending the checkout interface element further includes the merchant item data for the first item.

* * * * *